(12) United States Patent
Yoo et al.

(10) Patent No.: US 10,990,498 B2
(45) Date of Patent: Apr. 27, 2021

(54) DATA STORAGE DEVICE AND OPERATING METHOD THEREOF

(71) Applicant: SK hynix Inc., Gyeonggi-do (KR)

(72) Inventors: Injae Yoo, Mountain View, CA (US); Dong Yeob Chun, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/181,883

(22) Filed: Nov. 6, 2018

(65) Prior Publication Data
US 2019/0286350 A1    Sep. 19, 2019

(30) Foreign Application Priority Data
Mar. 19, 2018    (KR) .................... 10-2018-0031481

(51) Int. Cl.
| | |
|---|---|
| *G06F 11/30* | (2006.01) |
| *G06F 3/06* | (2006.01) |
| *G06F 1/329* | (2019.01) |
| *G06F 1/3225* | (2019.01) |
| *G06F 1/3228* | (2019.01) |
| *G06F 1/3234* | (2019.01) |

(52) U.S. Cl.
CPC .......... *G06F 11/3062* (2013.01); *G06F 1/329* (2013.01); *G06F 1/3225* (2013.01); *G06F 1/3228* (2013.01); *G06F 1/3275* (2013.01); *G06F 3/0625* (2013.01); *G06F 3/0631* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 5,894,579 | A * | 4/1999 | Fujihara | .................... G06F 1/26 713/324 |
| 8,429,436 | B2 * | 4/2013 | Fillingim | ............... G11C 5/141 711/100 |
| 9,063,732 | B2 | 6/2015 | Byom et al. | |

(Continued)

FOREIGN PATENT DOCUMENTS

| | | |
|---|---|---|
| KR | 1020050095794 | 10/2005 |
| KR | 10-2017-0035320 | 3/2017 |

*Primary Examiner* — Charles J Choi
(74) *Attorney, Agent, or Firm* — IP & T Group LLP

(57) ABSTRACT

A data storage device includes a nonvolatile memory device including dies; and a controller. The controller includes a processor configured to transmit operation commands to the nonvolatile memory device, and output control signals instructing to generate power consumption profiles for dies which operate; and a power management unit configured to operate according to the control signals. The power management unit includes a power profile command table in which power profile commands corresponding to each of the operation commands are stored; a power profile command processing circuit configured to generate the power consumption profiles, by processing the power profile commands corresponding to each control signal; and a power budget scheduler configured to determine whether to transmit the operation commands to the nonvolatile memory device, depending on a total power consumption amount summed at each set unit time based on the power consumption profiles.

14 Claims, 11 Drawing Sheets

(56) References Cited

U.S. PATENT DOCUMENTS

| | | | |
|---|---|---|---|
| 9,880,605 B2* | 1/2018 | Thangaraj | G06F 1/3268 |
| 10,025,367 B2 | 7/2018 | Kaburlasos et al. | |
| 2012/0192003 A1 | 7/2012 | Akiyama et al. | |
| 2013/0311707 A1 | 11/2013 | Kawamura et al. | |
| 2014/0112079 A1 | 4/2014 | Wakrat et al. | |

* cited by examiner

Power Profile CMD

M1 : Power profile CMD end reference setting bit
M2 : Value application scheme setting bit for corresponding time period
Time : Power profile generation time corresponding to power profile CMD
Value : Power value to be applied to set time period

DATA STORAGE DEVICE AND OPERATING METHOD THEREOF

CROSS-REFERENCE TO RELATED APPLICATION

The present application claims priority under 35 U.S.C. § 119(a) to Korean application number 10-2018-0031481, filed on Mar. 19, 2018, in the Korean Intellectual Property Office, which is incorporated herein by reference in its entirety.

BACKGROUND

1. Technical Field

Various embodiments generally relate to a semiconductor device. Particularly, the embodiments relate to a data storage device and an operating method thereof.

2. Related Art

Recently, the paradigm for the computer environment has shifted to ubiquitous computing in which computer systems can be used anytime and anywhere. As a result, the use of portable electronic devices such as mobile phones, digital cameras, and notebook computers has rapidly increased. In general, such portable electronic devices use a data storage device which uses a memory device. A data storage device stores data for use in a portable electronic device.

Since there is no mechanical driving part, a data storage device using a memory device provides advantages such as excellent stability and durability, high information access speed, and low power consumption. Data storage devices having such advantages include a universal serial bus (USB) memory device, memory cards having various interfaces, a universal flash storage (UFS) device, and a solid state drive (SSD).

SUMMARY

Various embodiments are directed to a data storage device capable of improving an operational performance by efficiently managing a limited power budget, and an operating method thereof.

In an embodiment, a data storage device may include a nonvolatile memory device including a plurality of dies; and a controller configured to control the nonvolatile memory device. The controller may include a processor configured to transmit operation commands to the nonvolatile memory device based on requests of a host device, and output control signals instructing to generate power consumption profiles for dies which operate in response to the operation commands; and a power management unit configured to operate according to the control signals outputted from the processor. The power management unit may include a power profile command table in which one or more power profile commands corresponding to each of the operation commands are stored; a power profile command processing circuit configured to generate the power consumption profiles, by processing the one or more power profile commands corresponding to each control signal; and a power budget scheduler configured to determine whether to transmit the operation commands to the nonvolatile memory device, depending on a total power consumption amount summed at each set unit time based on the power consumption profiles.

In an embodiment, a method for operating a data storage device including a nonvolatile memory device including a plurality of dies and a controller controlling the nonvolatile memory device and including a power profile command table in which one or more power profile commands for each of operation commands to be transmitted to the nonvolatile memory device are stored may include transmitting operation commands to the nonvolatile memory device based on requests received from a host device, and outputting control signals instructing to generate power consumption profiles for dies which operate in response to the operation commands; generating the power consumption profiles, by processing one or more power profile commands corresponding to each of the control signals; and determining whether to transmit the operation commands to the nonvolatile memory device, depending on a total power consumption amount summed at each set unit time based on the power consumption profiles.

In an embodiment, a data storage device may include a memory device including a plurality of dies and a controller configured to generate, for each of the plurality of dies, a power profile of at least one operation, the power profile indicating change of power consumption amount over time, determine a total power consumption amount by summing power consumption amounts of the plurality of dies at a set time based on the profile for each of the plurality of dies and transmit a command for an operation for a certain die among the plurality of dies based on the total power consumption amount.

According to the embodiments, it is possible to generate a power consumption profile by representing an actual power consumption amount changing with the lapse of time, for each of the dies of a nonvolatile memory device, through using power profile commands defined for each operation command.

Due to this fact, it is possible to be precisely aware of a power consumption history per unit time set for the nonvolatile memory device. As a result, since it is possible to efficiently manage a limited power budget and quickly process a new operation command, operational performance may be improved.

DETAILED DESCRIPTION

Figure 1:
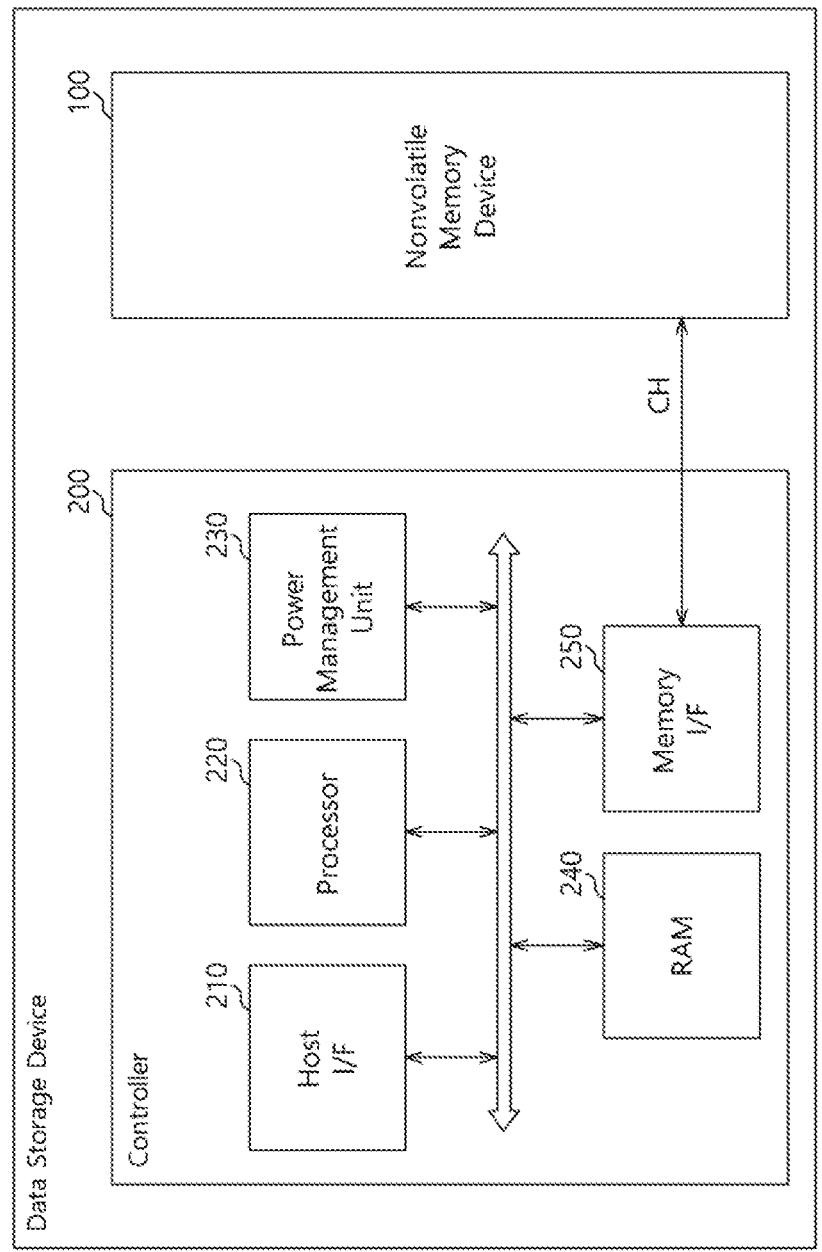
FIG. 1 is a block diagram illustrating a data storage device in accordance with an embodiment.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

A data storage device and an operating method thereof will be described below with reference to the accompanying drawings in the context of various embodiments. It is noted that throughout the specification, reference to "an embodiment," "another embodiment," or the like is not necessarily to only one embodiment, and different references to any such phrase are not necessarily to the same embodiment(s).

FIG. 1 is a block diagram illustrating a data storage device 10 in accordance with an embodiment. In the illustrated embodiment, the data storage device 10 may store data to be accessed by a host device (not shown) such as a mobile phone, an MP3 player, a laptop computer, a desktop computer, a game player, a television (TV), an in-vehicle infotainment system, and so forth. The data storage device 10 may also be referred to as a memory system.

The data storage device 10 may be configured as any of various kinds of storage devices according to a host interface, i.e., a transmission protocol with respect to the host device. For example, the data storage device 10 may be configured as any one of a solid state drive, a multimedia card (e.g., an MMC, an eMMC, an RS-MMC and a micro-MMC), a secure digital card (e.g., an SD, a mini-SD and a micro-SD), a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The data storage device 10 may be manufactured as any one among various package types. For example, the data storage device 10 may be manufactured as a package-on-package (POP), a system-in-package (SIP), a system-on-chip (SOC), a multi-chip package (MCP), a chip-on-board (COB), a wafer-level fabricated package (WFP) and a wafer-level stack package (WSP).

Referring to FIG. 1, the data storage device 10 may include a nonvolatile memory device 100 and a controller 200.

The nonvolatile memory device 100 may operate as the storage medium of the data storage device 10. The nonvolatile memory device 100 may be configured by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using a chalcogenide alloy, and a resistive random access memory (RERAM) using a transition metal compound, depending on memory cells.

The nonvolatile memory device 100 may include a memory cell array (not shown) which has a plurality of memory cells respectively disposed at regions where a plurality of bit lines (not shown) and a plurality of word lines (not shown) intersect with each other. The memory cell array may include a plurality of memory blocks, and each of the plurality of memory blocks may include a plurality of pages.

For example, each memory cell of the memory cell array may be a single level cell (SLC) storing one bit, a multi-level cell (MLC) capable of storing 2-bit data, a triple level cell (TLC) capable of storing 3-bit data or a quadruple level cell (QLC) capable of storing 4-bit data. The memory cell array may include single level cells, multi-level cells, triple level cells, and/or quadruple level cells. The memory cell array may include memory cells of a 2-dimensional horizontal structure or memory cells of a 3-dimensional vertical structure.

Figure 2:
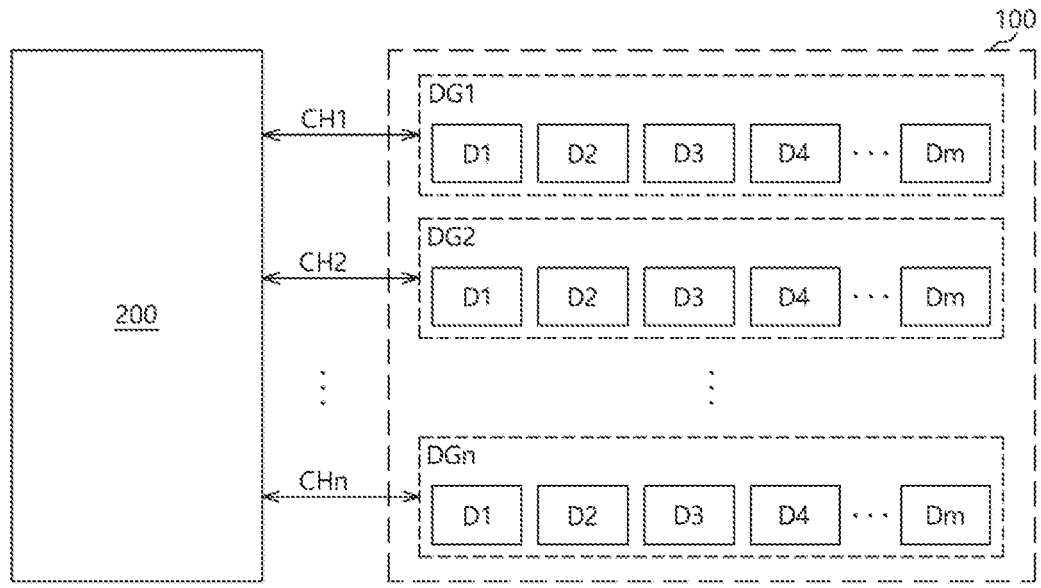
FIG. 2 is a block diagram illustrating a plurality of channels and a plurality of die groups respectively coupled to the channels.

FIG. 2 is a block diagram illustrating a plurality of channels and a plurality of die groups coupled to the respective channels.

Referring to FIG. 2, the nonvolatile memory device 100 may include a plurality of die groups DG1 to DGn. Each of the plurality of die groups DG1 to DGn may include a plurality of dies D1 to Dm. The die groups DG1 to DGn may be coupled with the controller 200 through channels CH1 to CHn, respectively. Although FIG. 2 illustrates that the number of channels CH1 to CHn corresponds to the number of die groups DG1 to DGn, the present invention is not limited specifically thereto. In another embodiment, one channel CH may be shared by two or more of the die groups DG. The dies D1 to Dm may be NAND flash memory devices.

Referring again FIG. 1, the controller 200 may include a host interface (Host I/F) 210, a processor 220, a power management unit 230, a random access memory (RAM) 240 and a memory interface (Memory I/F) 250.

The host interface 210 may interface the host device (not shown) and the data storage device 100. For example, the host interface 210 may communicate with the host device by using any one among standard transmission protocols such as universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-e or PCIe) protocols.

The processor 220 may be implemented by a micro control unit (MCU) or a central processing unit (CPU). The processor 220 may process a request received from the host device. In order to process the request received from the host device, the processor 220 may drive a code type instruction or algorithm, that is, a software, loaded in the random access memory 240, and may control internal function blocks of the controller 200 and the nonvolatile memory device 100.

The power management unit 230 may be implemented to manage an amount of power to be consumed by operations to be performed in the nonvolatile memory device 100. For example, the power management unit 230 may process a power profile command corresponding to each of operations to be performed in the nonvolatile memory device 100. Further, the power management unit 230 may generate a power consumption profile spanning a period of time for each operation based on the power profile command. Furthermore, the power management unit 230 may sum generated power consumption amounts for the respective operations at each set unit time, e.g., at set time intervals, and manage a summed total power consumption amount to be within a set power budget.

Figure 3:
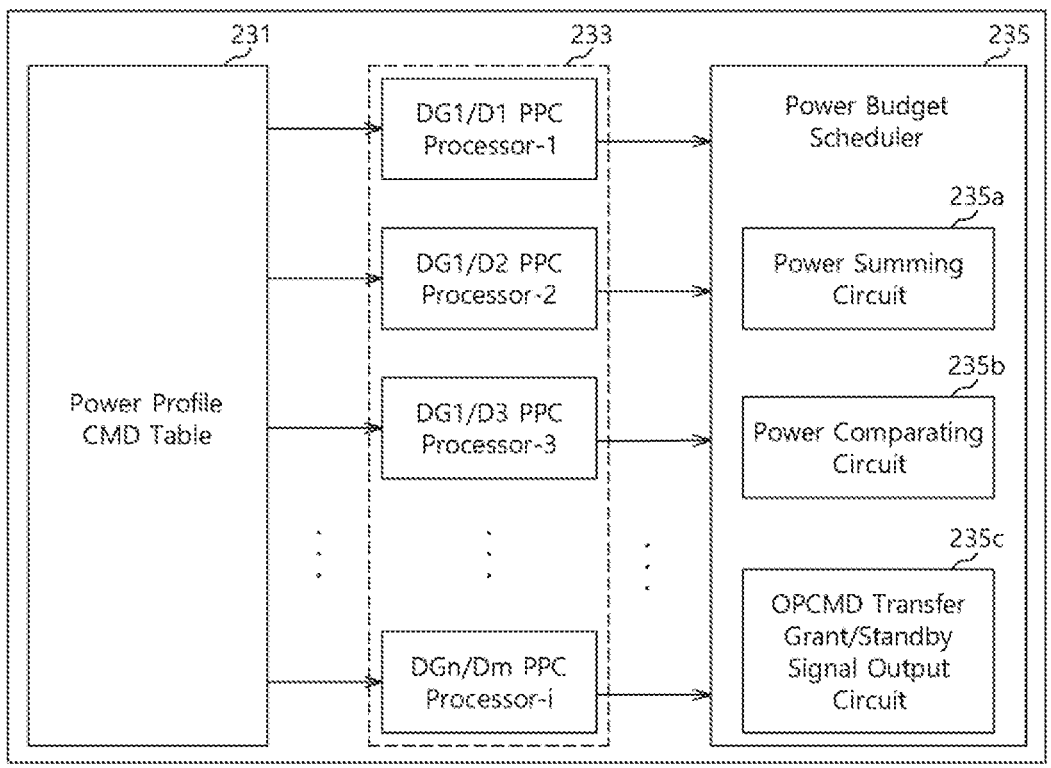
FIG. 3 is a diagram illustrating a power management unit in accordance with an embodiment.

FIG. 3 is a diagram illustrating a power management unit in accordance with an embodiment, for example, the power management unit 230 shown in FIG. 1.

Referring to FIG. 3, the power management unit 230 may include a power profile command table 231, a power profile command processing circuit 233 and a power budget scheduler 235.

In the power profile command table 231, one or more power profile commands may be stored. One or more of the power profile commands may correspond to each of operation commands based on various requests received from the host device. A power profile command is for generating a power consumption profile over a period of time, for a die operating in response to a corresponding operation command. A power profile command may have a value which is set to represent a change in a power amount to be actually consumed within the corresponding time period in a die operating in response to a corresponding operation command.

Alternatively, the power profile command table 231 may be stored in a specific region (for example, a system region) of the nonvolatile memory device 100. The power profile command table 231 may be read from a corresponding region of the nonvolatile memory device 100 and be loaded in a memory (not shown) in the power management unit 230, when the data storage device 10 is powered on.

Figure 4:
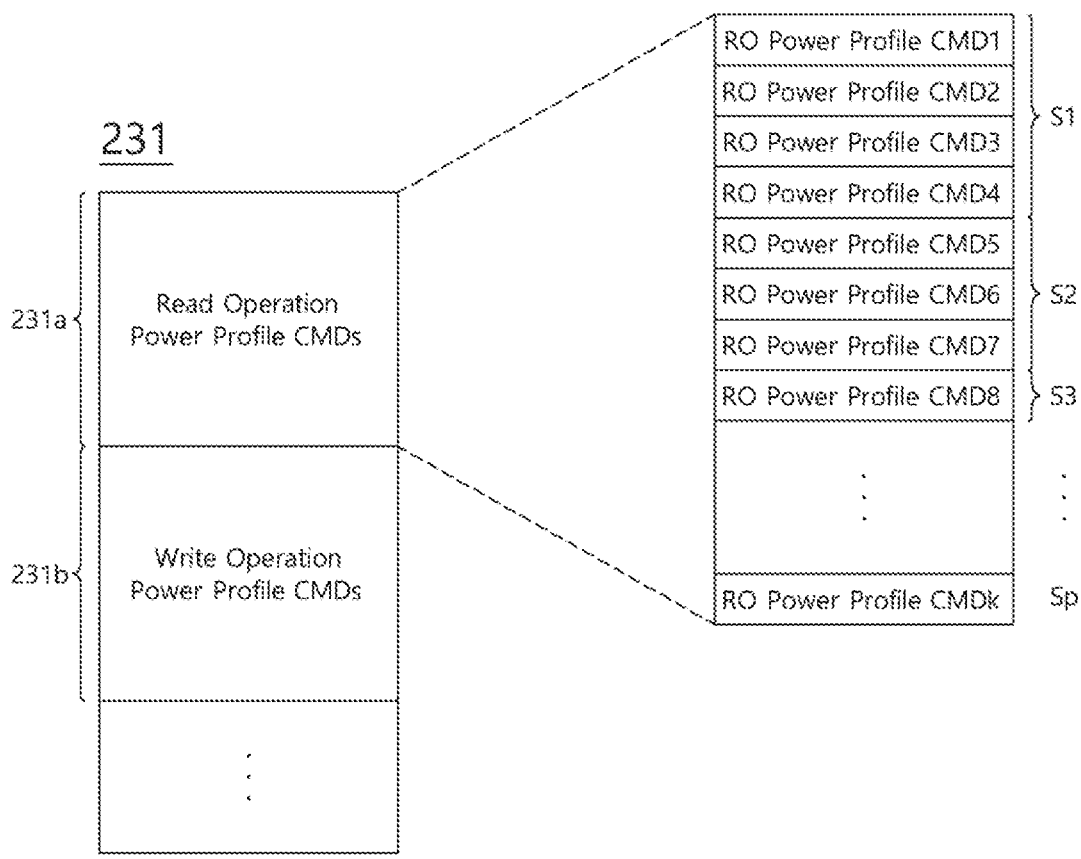
FIG. 4 is a diagram illustrating a power profile command table in accordance with an embodiment.

FIG. 4 is a diagram illustrating a power profile command table in accordance with an embodiment, for example, the power profile command table 231 shown in FIG. 3.

Referring to FIG. 4, the power profile command table 231 may include a first region 231a and a second region 231b. In the first region 231a, there may be stored read operation power profile commands for generating power consumption profiles associated with read operations. In the second region 231b, there may be stored write operation power profile commands for generating power consumption profiles associated with write operations. Although it is illustrated in FIG. 4 that the power profile command table 231 includes two regions 231 and 231b for two different operations, it is to be noted that power profile commands corresponding for other operations or requests from the host device may be stored in the power profile command table 231.

As shown in FIG. 4, the first region 231a may include a plurality of read operation power profile command sets S1, S2, S3, ..., Sp. Each of the read operation power profile command sets S1, S2, S3, ..., Sp may include one or more read operation power profile commands RO power profile CMDs. Although it is illustrated in FIG. 4 that the first region 231a includes the read operation power profile command sets S1, S2, S3, ... Sp, it is to be noted that the second region 231b may also include a plurality of write operation power profile command sets each of which includes one or more write operation power profile commands.

A power consumption profile for one operation over a period of time may change at a specific time. In order to represent a change to be substantially the same as an actual power consumption amount, a power profile command set including a plurality of power profile commands may be processed for one operation. The indexes of respective power profile command sets, that is, indexes such as S1 and S2, may correspond to specific operation commands, respectively. Hence, when the processor 220 generates an operation command based on a request from the host device and provides the generated operation command to the memory interface 250, the processor 220 may provide together the index of a power profile command set corresponding to the corresponding operation command, to the memory interface 250.

Figure 5:
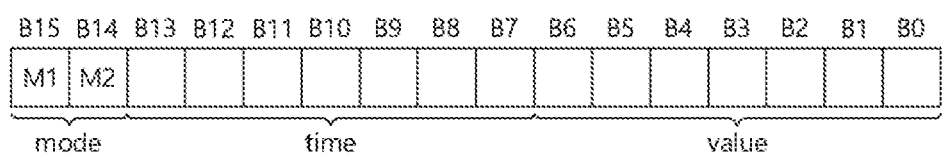
FIG. 5 is a diagram illustrating a power profile command in accordance with an embodiment.

FIG. 5 is a diagram illustrating a power profile command in accordance with an embodiment.

Referring to FIG. 5, the power profile command may include a plurality of bits B0 to B15, which may have a bitmap structure. While a power profile command is illustrated in FIG. 5 as a bitmap including 16 bits, it is to be noted that the number of bits included in a power profile command is not limited specifically thereto.

A power profile command may include a mode setting region, a power profile generation time setting region and a power value setting region, identified as 'mode,' 'time' and 'value,' respectively in FIG. 5. While the power value setting region 'value,' the power profile generation time setting region 'time' and the mode setting region 'mode' are sequentially defined from the least significant bit B0, it is to be noted that the positions of the respective regions are not limited specifically thereto.

The mode setting region may include a most significant bit B15 and a next most significant bit B14. The power value setting region 'value' may include a least significant bit B0 to a seventh, most significant bit B6. The power profile generation time setting region 'time' may include an eighth e.g., least significant) bit B7 to a fourteenth, e.g., most significant, bit B13.

The mode setting region may include a first mode setting bit M1 and a second mode setting bit M2. The first mode setting bit M1 may be set to a value indicates that an end reference of a power profile command. For example, if the first mode setting bit M1 is set to a first value (for example, '0'), an operation of generating a power consumption profile in correspondence to a corresponding power profile command may be ended when a signal indicating that the operation of a corresponding operation command is completed is received from the memory interface 250. If the first mode setting bit M1 is set to a second value (for example, '1'), an operation of generating a power consumption profile in response to a corresponding power profile command may be ended when a time set in the power profile generation time setting region elapses.

The second mode setting bit M2 may be set to a value indicates a scheme in which a set power value is applied for a set time period. For example, if the second mode setting bit M2 is set to a first value (for example, '0'), a set power value may be applied as a constant for a set time period. In other words, if the second mode setting bit M2 is '0,' a power consumption profile in which a set power value is held for a set time period may be generated. If the second mode setting bit M2 is set to a second value (for example, '1'), a set power value may be applied as a difference value for a set time period. Namely, if the second mode setting bit M2 is '1,' a power consumption profile in which a set power value is decreased at each set unit time during a set time period may be generated.

The power profile generation time setting region may be set to a value indicating a time period from a time when a power consumption profile is generated to a time when the generation of the power consumption profile is completed. The power value setting region may be set to a value indicating a power value to be applied for a time period set in the power profile generation time setting region.

Referring again to FIG. 3, the power profile command processing circuit 233 may generate a power consumption profile by fetching the power profile commands of a corresponding power profile command set from the power profile command table 231, based on the index (for example, S1 and S2 of FIG. 4) of the power profile command set provided from the memory interface 250 and by processing the fetched power profile commands.

Figure 6:
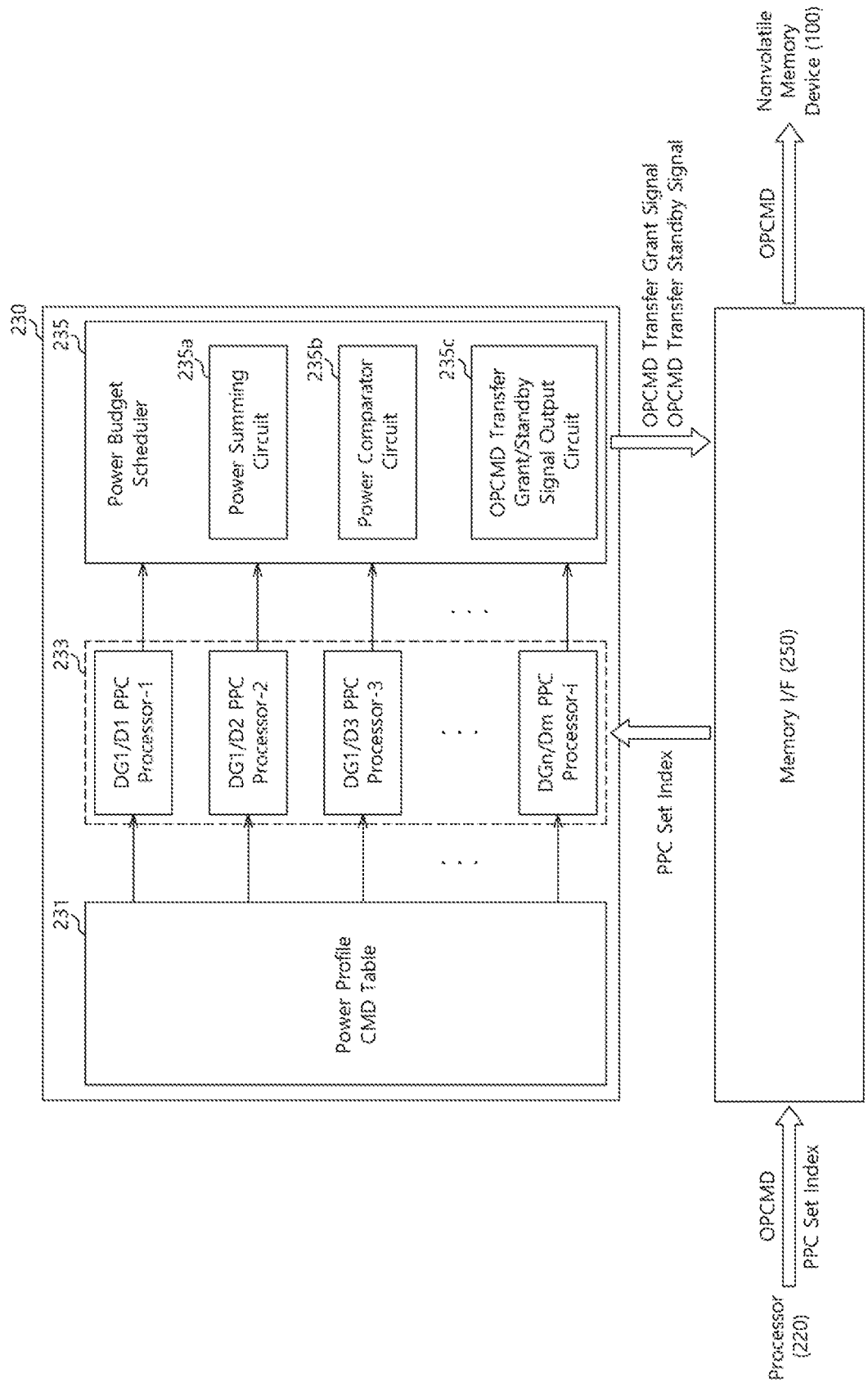
FIG. 6 is a diagram illustrating interactions among a processor, a memory interface and a power management unit in accordance with an embodiment.

Referring to FIG. 6, the power profile command processing circuit 233 may include a plurality of processors (Processor-1 to Processor-i) corresponding to the plurality of dies D1 to Dm of the respective die groups DG1 to DGn of the nonvolatile memory device 100. The plurality of processors (for example, power profile command (PPC) processors) Processor-1 to Processor-i may be individually coupled with the memory interface 250 of FIG. 1. Due to this fact, the memory interface 250 may determine a die D for which a corresponding operation is to be performed, based on an operation command (see the reference symbol OPCMD in FIG. 6) received from the processor 220, and may provide the index of a power profile command set to a processor of the power profile command processing circuit 233 which corresponds to the determined die D.

The respective processors Processor-1 to Processor-i of the power profile command processing circuit 233 may generate power consumption profiles. Further, the processors Processor-1 to Processor-i may provide the power consumption amounts of the respective dies D1 to Dm to the power budget scheduler 235 at each set unit time, based on the generated power consumption profiles.

The power budget scheduler 235 may sum power consumption amounts for the respective dies D1 to Dm of the respective die groups DG1 to DGn which are provided at each set unit time from the power profile command processing circuit 233. Further, the power budget scheduler 235 may compare a summed power consumption amount with the set power budget, and may calculate a marginal power based on the comparison result.

The power budget scheduler 235 may include a power summing circuit 235a, a power comparator circuit 235b and an operation command (OPCMD) transfer grant/standby signal output circuit 235c. The power summing circuit 235a may sum power consumption amounts for the respective dies D1 to Dm of the respective die groups DG1 to DGn which are provided at each set unit time from the power profile command processing circuit 233. Then, the power summing circuit 235a may provide a summed power consumption amount to the power comparator circuit 235b. The power comparator circuit 235b may calculate a marginal power by comparing the summed power consumption amount provided from the power summing circuit 235a with the set power budget. Then, and the power comparator circuit 235b may provide the calculated marginal power to the operation command transfer grant/standby signal output circuit 235c. The operation command transfer grant/standby signal output circuit 235c may determine whether the marginal power provided from the power comparator circuit 235b is sufficient to perform a new operation command. When it is determined that the marginal power is sufficient, the operation command transfer grant/standby signal output circuit 235c may output a new operation command transfer grant signal to the memory interface 250. When it is determined that the marginal power is not sufficient, the operation command transfer grant/standby signal output circuit 235c may output a new operation command transfer standby signal to the memory interface 250.

FIG. 6 is a diagram illustrating interactions among a processor, a memory interface and a power management unit in accordance with an embodiment, for example, interactions among the processor 220, the memory interface (I/F) 250 and the power management unit 230. For convenience, it is assumed that, in FIG. 6, an operation command OPCMD provided to the memory interface 250 by the processor 220 is a new operation command. Further, it is assumed that operations for previously received operation commands are being performed in a plurality of dies D of the nonvolatile memory device 100.

Referring to FIG. 6, the processor 220 may provide the operation command OPCMD and a power profile command (PPC) set index to the memory interface 250. The operation command OPCMD is generated based on a request received from the host device. The power profile command (PPC) set index is corresponding to the operation command OPCMD. The memory interface 250 may determine a specific die D for which an operation is to be performed based on the received operation command OPCMD. The memory interface 250 may provide the power profile command set index to a certain processor of the power profile command processing circuit 233 which corresponds to the determined specific die D.

The certain processor of the power profile command processing circuit 233 may receive the power profile command set index from the memory interface 250. The certain processor may generate a power consumption profile. The power consumption profile may be corresponding to the corresponding operation command OPCMD by fetching one or more power profile commands of a corresponding power profile command set from the power profile command table 231. The certain processor may provide the power budget scheduler 235 with a power consumption amount based on the generated power consumption profile. The power consumption amount (for example, an initial power consumption amount) may correspond to an operation starting time for the new operation command.

The power summing circuit 235a and the power comparator circuit 235b of the power budget scheduler 235 may repeatedly perform, at each set unit time, a series of operations of summing the power consumption amounts provided from the power profile command processing circuit 233, comparing a summed power consumption amount with the set power budget and calculating a marginal power based on the comparison result. If the initial power consumption amount for the new operation command OPCMD is provided from the power profile command processing circuit 233, the power budget scheduler 235 may compare a marginal power at a corresponding time with the initial power consumption amount of the new operation command OPCMD, and may determine whether the marginal power is sufficient to perform the new operation command OPCMD. If the marginal power is sufficient, the power budget scheduler 235 may provide a new operation command transfer grant signal to the memory interface 250. If the marginal power is not sufficient, the power budget scheduler 235 may provide a new operation command transfer standby signal to the memory interface 250.

The memory interface 250 may provide the new operation command OPCMD to the nonvolatile memory device 100 when the new operation command transfer grant signal is provided from the power budget scheduler 235.

Figure 7:
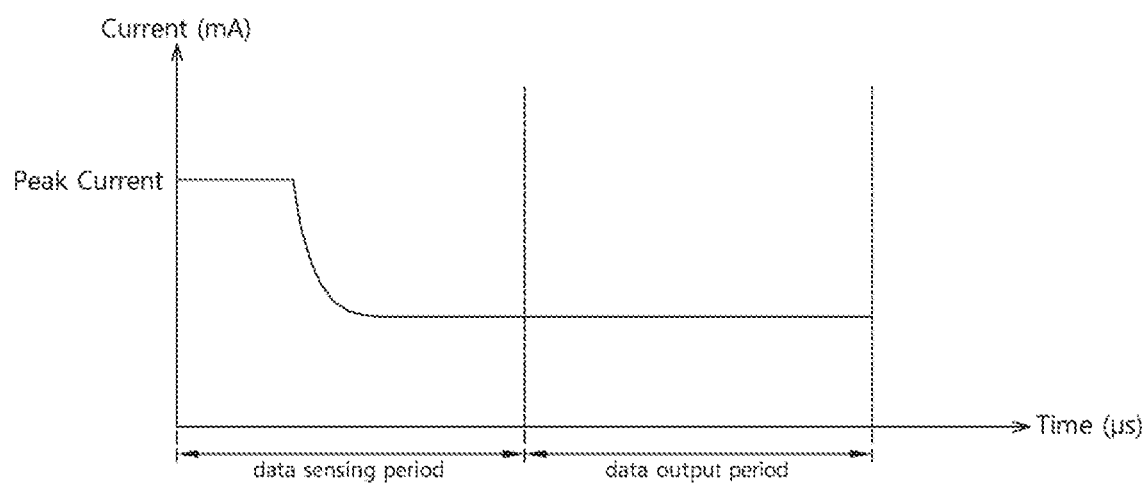
FIG. 7 is a diagram illustrating a power consumption profile over a period of time for a read operation in accordance with an embodiment.

FIG. 7 is a diagram illustrating a power consumption profile with the lapse of time in a read operation in accordance with an embodiment.

Referring to FIG. 7, in a normal read operation, power consumption is highest in an initial part of a data sensing period for sensing data from memory cells, decreases later in the data sensing period to a lower level, and remains at that lower level in a data output period for outputting sensed data to an external device, e.g., the controller 200. Generally, a power consumption amount for each operation may be set to a fixed value corresponding to a maximum value, that is, a peak current. Due to this fact, despite that a power consumption amount decreases over time, the controller 200 may determine a power consumption amount for a corresponding operation, as the set fixed value, until the corresponding operation is completed. Due to this fact, despite that there is actually marginal power sufficient to perform a new operation command, as it is determined that marginal power is not sufficient and a new operation command is not performed before a certain operation among operations being performed is completed, operational performance may deteriorate.

In a present embodiment, by generating a power consumption profile, it is possible to determine to fairly precisely a total power consumption history for the nonvolatile memory device 100. The power consumption profile may be generated using power profile commands for each operation. The power consumption profile may substantially follow a power consumption amount that changes with the lapse of time in a die operating in response to a certain operation command. The power consumption profile may represent a power consumption amount that changes with the lapse of time for each operation. As a result, since it is possible to efficiently manage a set power budget and quickly process a new operation command, operational performance may be improved.

Figures 8A, 8B:
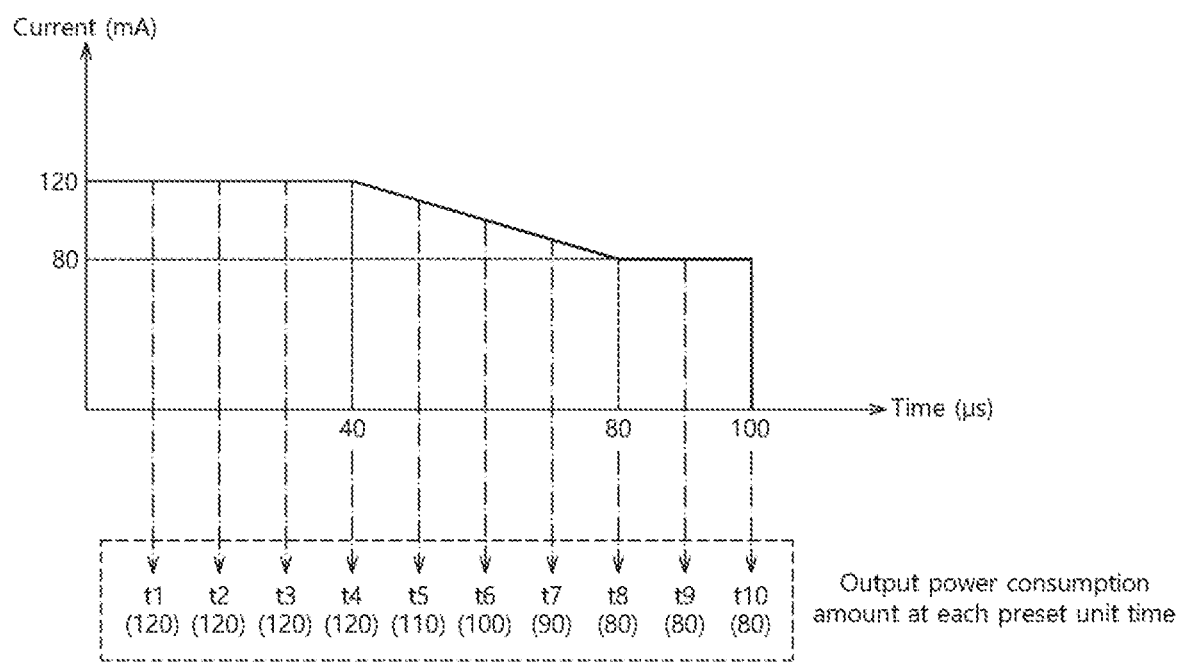
FIG. 8A is a diagram illustrating setting power profile commands in accordance with an embodiment.
FIG. 8B is a diagram illustrating a power consumption profile generated by processing power profile commands in accordance with an embodiment.

FIG. 8A is a diagram illustrating setting a power profile command set in accordance with an embodiment, and FIG. 8B is a diagram illustrating a power consumption profile generated based on the power profile command set of FIG. 8A. The power consumption profile may be generated by the power profile command processing circuit 233 of FIG. 3. In FIG. 8A, one power profile command set S1 having four power profile commands PPC1 to PPC4 will be described as an example. Also, it is assumed that the power profile commands PPC1 to PPC4 are sequentially executed from the first power profile command PPC1. Further, it is assumed that a time unit is 'μs' and a current unit is 'mA.'

Referring to FIG. 8A, all the first mode setting bits M1 of the first to fourth power profile commands PPC1 to PPC4 of the power profile command set S1 are set to '1.' Therefore, based on all the first to fourth power profile commands PPC1 to PPC4, the generation of a power consumption profile may end when a time set in the power profile generation time setting region elapses.

Since the second mode setting bit M2 of the first power profile command PPC1 is set to '0,' the power profile generation time setting region is set to '40 μs' and the power value setting region is set to '120 mA,' as shown in FIG. 8B, a power consumption profile that is held at '120 mA' from 0 μs to 40 μs may be generated. Since the power profile generation time setting region includes bit values '0101000', the power profile generation time is determined as 40 μs (=32+8). Since the power value setting region includes bit values '1111000', the power value is determined as 120 mA (=64+32+16+8).

Since the second mode setting bit M2 of the second power profile command PPC2 is set to '1,' the power profile generation time setting region is set to '40 μs' and the power value setting region is set to '10 mA,' as shown in FIG. 8B, a power consumption profile that decreases to '80 mA' from 40 μs to 80 μs may be generated. Since the power profile generation time setting region includes bit values '0101000', the power profile generation time is determined as 40 μs (=32+8). Since the power value setting region includes bit values '0001010,' the power value is determined as 10 mA (=8+2).

Since the second mode setting bit M2 of the third power profile command PPC3 is set to '0,' the power profile generation time setting region is set to '20 μs' and the power value setting region is set to '80 mA,' as shown in FIG. 8B, a power consumption profile that is held at '80 mA' from 80 μs to 100 μs may be generated. Since the power profile generation time setting region includes bit values '0010100', the power profile generation time is determined as 20 μs (=16+4). Since the power value setting region includes bit values '1010000,' the power value is determined as 80 mA (=64+16).

Since the power profile generation time setting region of the fourth power profile command PPC4 is set to '0 μs,' the second mode setting bit M2 and the power value setting region may be neglected even when any values are stored therein. That is to say, since it is not necessary to generate a power profile, even when the second mode setting bit M2 and the power value setting region are set to a value of '1' or '0,' no influence may be exerted. Thus, in FIG. 8A, the second mode setting bit M2 and the power value setting region are marked with 'X.' In this way, when performing one operation command by using the four power profile commands PPC1 to PPC4 included in one power profile command set S1, it is possible to represent a power consumption amount that changes with the lapse of time.

Also, as shown in FIG. 8B, the power profile command processing circuit 233 of FIG. 3 may output power consumption amounts to the power budget scheduler 235 at set unit times t1 to t10 based on generated power consumption profiles.

Referring again to FIG. 1, the random access memory 240 may be configured by a dynamic random access memory (DRAM) or a static random access memory (SRAM). The random access memory 240 may include a region where software to be driven by the processor 220 is stored. Further, the random access memory 240 may include a region where metadata necessary for driving the software is stored. Namely, the memory 240 may operate as a working memory of the processor 220.

The random access memory 240 may include a region which temporarily stores data to be transmitted from the host device to the nonvolatile memory device 100 or data to be read from the nonvolatile memory device 100 and be transmitted to the host device. In other words, the random access memory 240 may operate as a buffer memory.

The memory interface 250 may control the nonvolatile memory device 100 according to the control of the processor 220. The memory interface 250 may also be referred to as a memory controller. The memory interface 250 may provide control signals including a command, an address and the like for controlling the nonvolatile memory device 100, to the nonvolatile memory device 100. The memory interface 250 may provide, before transmitting control signals to the nonvolatile memory device 100, a power profile command set index transmitted together with the control signals, to the power management unit 230. The memory interface 250 may transmit the control signals to the nonvolatile memory device 100 when a transfer grant signal for the control signals is outputted from the power management unit 230.

The memory interface 250 may provide data to the nonvolatile memory device 100 or may be provided with data from the nonvolatile memory device 100. The memory interface 250 may be coupled with the nonvolatile memory device 100 through at least one channel CH.

Figure 9:
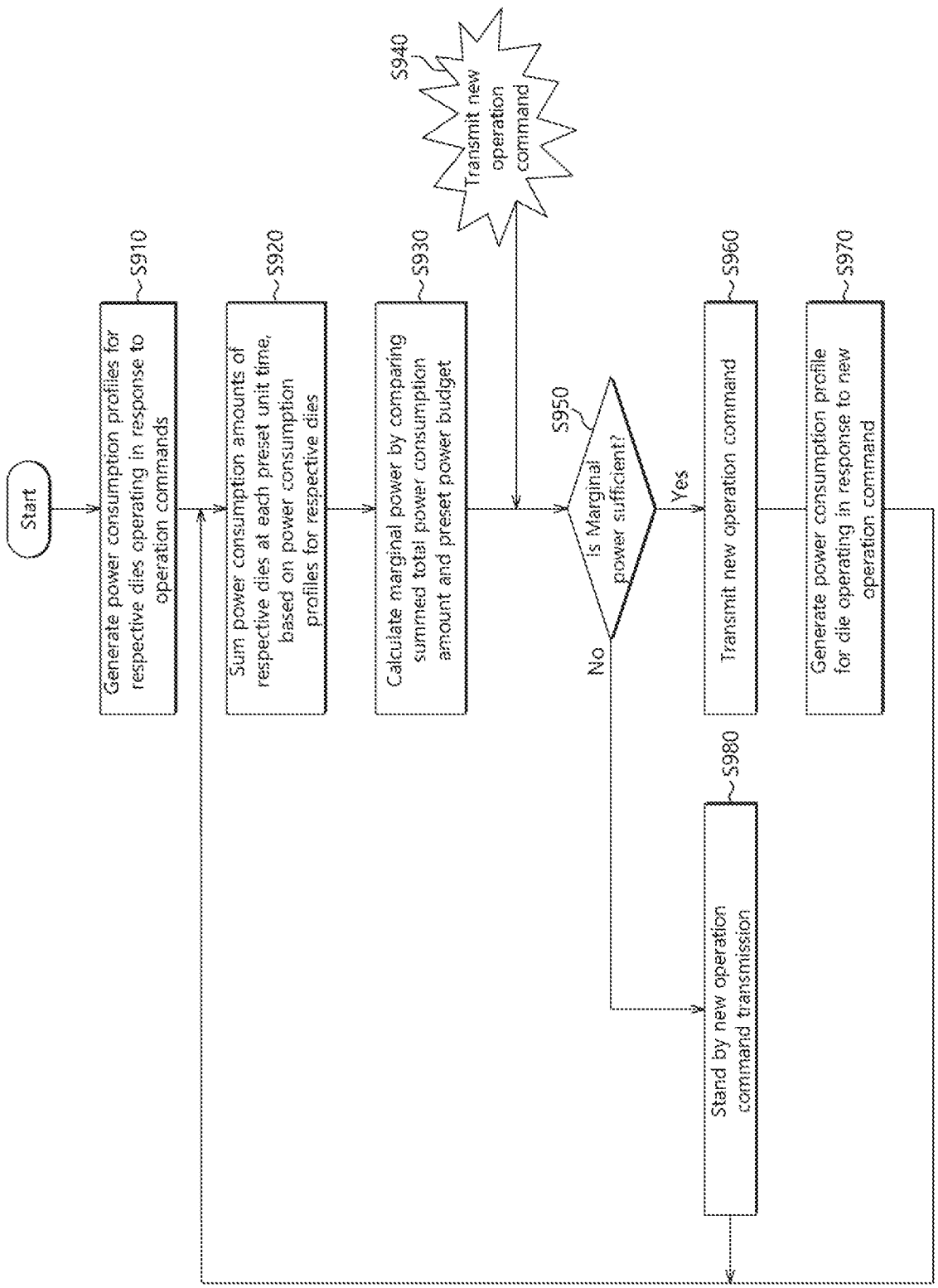
FIG. 9 is a flow chart illustrating a method for operating a data storage device in accordance with an embodiment.

FIG. 9 is a flow chart illustrating a method for operating a data storage device in accordance with an embodiment. In explaining such method, reference is also made to FIGS. 1 to 8B. At step S910, power consumption profiles for respective dies operating in response to operation commands based on requests received from the host device (not shown) may be generated. The power consumption profiles of the respective operating dies may be generated in the power management unit 230 of the controller 200 in FIG. 1.

The processor 220 of the controller 200 may generate the operation commands to be provided to the nonvolatile memory device 100, based on the requests received from the host device. Further, the processor 220 may transmit the generated operation commands and control signals instructing to generate the power consumption profiles corresponding to the operation commands, to the memory interface 250. The control signals may include the indexes of power profile command sets corresponding to the operation commands.

The memory interface 250 may determine dies which are to operate in response to the respective operation commands, based on the operation commands received from the processor 220. Further, the memory interface 250 may provide the indexes of power profile command sets to be processed, to power profile command processors of the power profile command processing circuit 233 of the power management unit 230 corresponding to the determined dies.

The power profile command processors of the power profile command processing circuit 233 of FIG. 3 may receive, from the memory interface 250, the indexes of the power profile command sets to be processed. Further, the power profile command processors of the power profile command processing circuit 233 may generate the power consumption profiles of the operating dies by fetching and processing corresponding power profile command sets, respectively, from the power profile command table 231.

At step S920, the power profile command processors of the power profile command processing circuit 233 may provide power consumption amounts for the respective operating dies to the power budget scheduler 235 of the power management unit 230 at each set unit time, based on the corresponding power consumption profiles. The power budget scheduler 235 may sum the power consumption amounts for the respective dies provided from the power profile command processing circuit 233 at each set unit time.

At step S930, the power budget scheduler 235 may calculate a marginal power by comparing a total power consumption amount summed at each set unit time with a set power budget.

The step S920 and the step S930 may be repeatedly performed at each set unit time until a die D which is performing an operation does not exist in the nonvolatile memory device 100. Accordingly, the marginal power calculated at the step S930 may change at each set unit time.

At step S940, if a new request is received from the host device, the processor 220 may transmit a new operation command to the memory interface 250. The processor 220 may transmit together a new control signal instructing to generate a power consumption profile corresponding to the new operation command, that is, the index of a power profile command set corresponding to the new operation command, to the memory interface 250.

The memory interface 250 may provide the index of the power profile command set to be processed, to a power profile command processor corresponding to a die which is to operate in response to the new operation command. The power profile command processor may generate the power consumption profile of the die which is to operate, by fetching and processing the corresponding power profile command set from the power profile command table 231. Further, the power profile command processor may provide an initial power consumption amount to the power budget scheduler 235 based on the power consumption profile of the die which is to operate.

At step S950, the power budget scheduler 235 may determine whether the marginal power is sufficient to perform the new operation command, by comparing the marginal power calculated at the step S930 with the initial power consumption amount for the new operation command provided from the power profile command processing circuit 233. If it is determined that the marginal power is sufficient (that is, "Yes" at step S950), the process may proceed to step S960.

At the step S960, the memory interface 250 may transmit the new operation command to the nonvolatile memory device 100. If it is determined that the marginal power is sufficient, the power budget scheduler 235 may provide an operation command transfer grant signal to the memory interface 250. Then, the memory interface 250 may transmit the new operation command to the nonvolatile memory device 100 according to the operation command transfer grant signal.

At step S970, by processing the power profile command set corresponding to the new operation command, the power consumption profile of the die D for which the new operation command is performed may be generated. Thereafter, the process may return to the step S920.

If it is determined that the marginal power is not sufficient to perform the new operation command (that is, "No" at step S950), the process may proceed to step S980.

At the step S980, the memory interface 250 may not transmit the new operation command to the nonvolatile memory device 100. If it is determined that the marginal power is not sufficient, the power budget scheduler 235 may provide an operation command transfer standby signal to the memory interface 250. Then, the memory interface 250 may not transmit the new operation command to the nonvolatile memory device 100 according to the operation command transfer standby signal.

Thereafter, the process may return to the step S920. The new operation command may be on standby until the marginal power becomes sufficient to perform the new operation command, and may be transmitted to the nonvolatile memory device 100 when the marginal power becomes sufficient.

Figure 10:
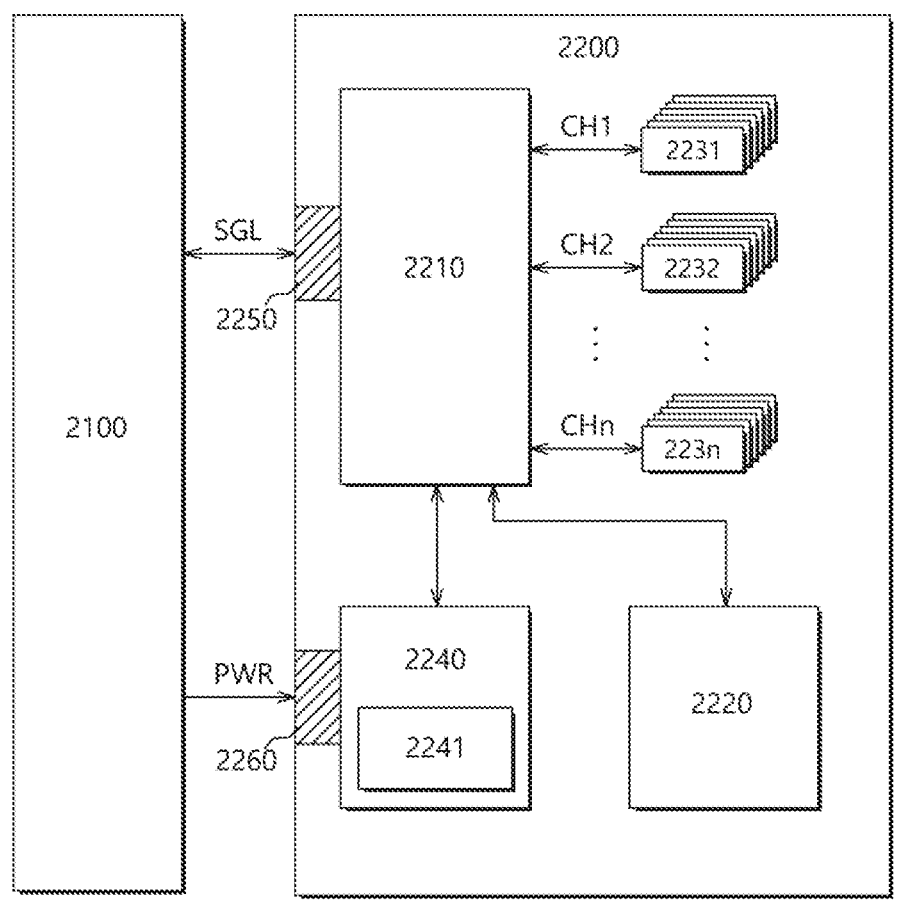
FIG. 10 is a diagram illustrating a data processing system including a solid state drive (SSD) according to an embodiment of the present disclosure.

FIG. 10 is a diagram illustrating a data processing system 2000 including a solid state drive (SSD) according to an embodiment. Referring to FIG. 10, the data processing system 2000 may include a host apparatus or device 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be configured of various types of connectors according to an interfacing method between the host 2100 and the SSD 2200.

Figure 11:
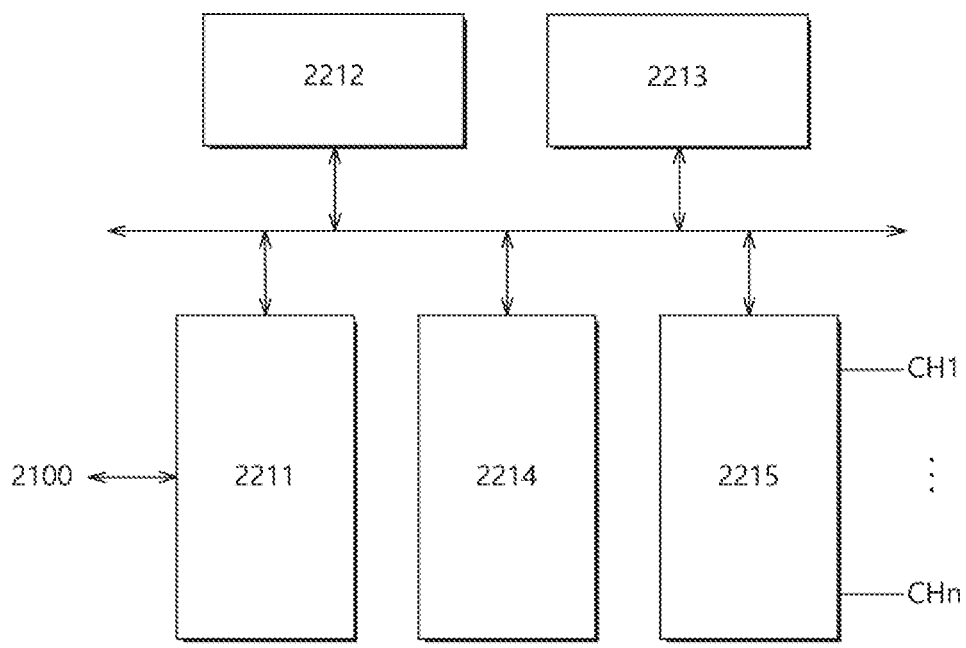
FIG. 11 is a diagram illustrating a controller according to an embodiment of the present disclosure.

FIG. 11 is a diagram illustrating a controller according to an embodiment of the present disclosure, for example, the controller 2210 of FIG. 10. Referring to FIG. 11, the controller 2210 may include a host interface 2211, a control component 2212, a random access memory (RAM) 2213, an error correction code (ECC) component 2214, and a memory interface 2215.

The host interface 2211 may perform interfacing between the host 2100 and the SSD 2200 according to a protocol of the host 2100. For example, the host interface 2211 may communicate with the host 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (DATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-e or PCIe) protocol, and a universal flash storage (UFS) protocol. The host interface 2211 may perform a disc emulation function that the host 2100 recognizes the SSD 2200 as a general-purpose data storage apparatus, for example, a hard disc drive HDD.

The control component 2212 may analyze and process the signal SGL input from the host 2100. The control component 2212 is may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 12:
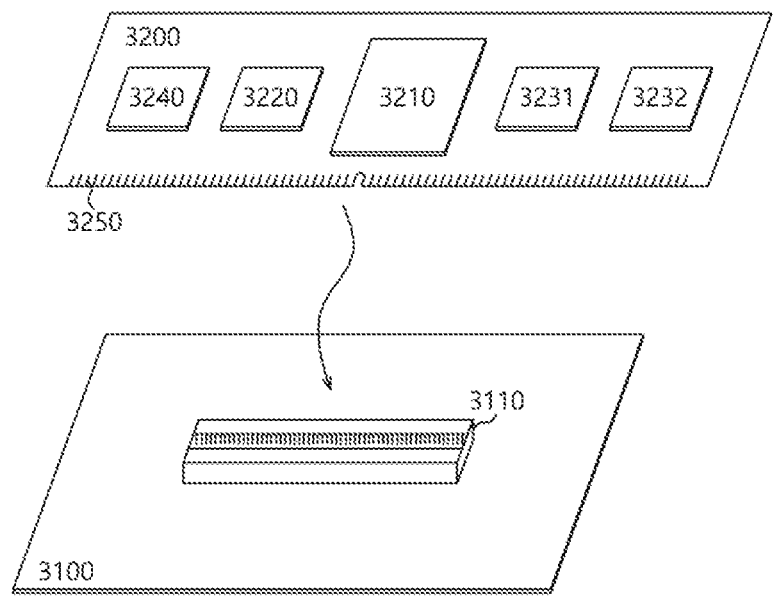
FIG. 12 is a diagram illustrating a data processing system including a data storage device according to an embodiment of the present disclosure.

FIG. 12 is a diagram illustrating a data processing system 3000 including a data storage device according to an embodiment. Referring to FIG. 12, the data processing system 3000 may include a host apparatus or device 3100 and a data storage device 3200.

The host 3100 may be configured in a board such as a printed circuit board (PCB). Although not shown in FIG. 12, the host 3100 may include internal functional blocks configured to perform functions of the host 3100.

The host 3100 may include a connection terminal 3110 such as a socket, a slot, or a connector. The data storage device 3200 may be mounted on the connection terminal 3110.

The data storage device 3200 may be configured in a board such as a PCB. The data storage device 3200 may refer to a memory module or a memory card. The data storage device 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage device 3200. The controller 3210 may be configured to have the same configuration as the controller 2210 illustrated in FIG. 11.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as a storage medium of the data storage device 3200.

The PMIC 3240 may provide power input through the connection terminal 3250 to the inside of the data storage device 3200. The PMIC 3240 may manage the power of the data storage device 3200 according to control of the controller 3210.

The connection terminal 3250 may be coupled to the connection terminal 3110 of the host 3100. A signal such as a command, an address, and data and power may be transmitted between the host 3100 and the data storage device 3200 through the connection terminal 3250. The connection terminal 3250 may be configured in various forms according to an interfacing method between the host 3100 and the data storage 3200. The connection terminal 3250 may be arranged in any one side of the data storage device 3200.

Figure 13:
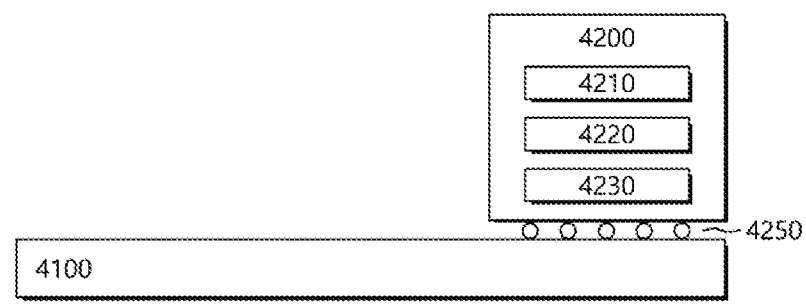
FIG. 13 is a diagram illustrating a data processing system including a data storage device according to an embodiment of the present disclosure.

FIG. 13 is a diagram illustrating a data processing system 4000 including a data storage apparatus according to an embodiment. Referring to FIG. 13, the data processing system 4000 may include a host apparatus or device 4100 and a data storage device 4200.

The host 4100 may be configured as a board such as a printed circuit board (PCB). Although not shown in FIG. 13, the host 4100 may include internal functional blocks configured to perform various functions.

The data storage device 4200 may be configured in a surface mounting packaging form. The data storage device 4200 may be mounted on the host 4100 through a solder ball 4250. The data storage device 4200 may include a controller 4210, a buffer memory device 4220, and a nonvolatile memory device 4230.

The controller 4210 may control an overall operation of the data storage device 4200. The controller 4210 may be configured to have the same configuration as the controller 2210 illustrated in FIG. 11.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host 4100 or the nonvolatile memory device 4230 through control of the controller 4210.

The nonvolatile memory device 4230 may be used as a storage medium of the data storage device 4200.

Figure 14:
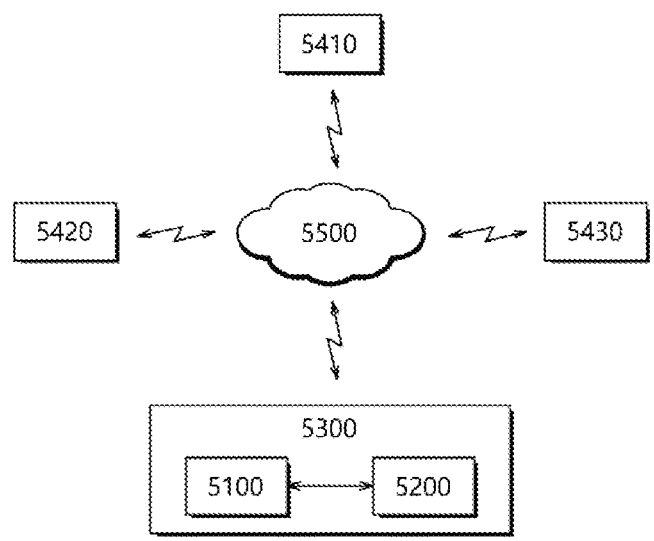
FIG. 14 is a diagram illustrating a network system including a data storage device according to an embodiment of the present disclosure.

FIG. 14 is a diagram illustrating a network system 5000 including a data storage device according to an embodiment. Referring to FIG. 14, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus or device 5100 and a data storage device 5200. The data storage device 5200 may be configured as the data storage device 10 of FIG. 1, the data storage device 2200 of FIG. 10, the data storage device 3200 of FIG. 12, or the data storage device 4200 of FIG. 13.

Figure 15:
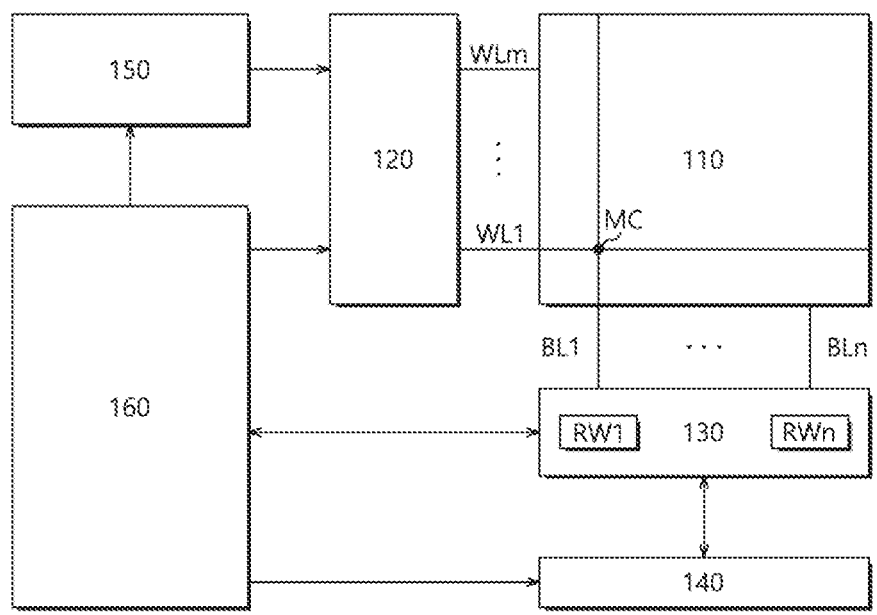
FIG. 15 is a block diagram illustrating a nonvolatile memory device included in a data storage device according to an embodiment of the present disclosure.

FIG. 15 is a block diagram illustrating a nonvolatile memory device 100 included in a data storage device according to an embodiment. Referring to FIG. 15, the nonvolatile memory device 100 may include a memory cell array 110, a row decoder 120, a column decoder 140, a data read and write (read/write) block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown) (e.g., the controller 200 of FIG. 1). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, in a write operation, the data read/write block 130 may operate as the write driver configured to store data provided from an external apparatus in the memory cell array 110. In another example, in a read operation, the data read/write block 130 may operate as the sense amplifier configured to read data from the memory cell array 110.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

The above described embodiments of the present invention are intended to illustrate and not to limit the present invention. Various alternatives and equivalents are possible. The invention is not limited by the embodiments described herein. Nor is the invention limited to any specific type of semiconductor device. The present invention encompasses all additions, subtractions, and/or modifications apparent to those skilled in the art in view of the present disclosure that fall within the scope of the appended claims.

What is claimed is:

1. A data storage device comprising:
   a nonvolatile memory device including a plurality of dies; and
   a controller configured to control the nonvolatile memory device, the controller comprising:
   a processor configured to transmit operation commands to the nonvolatile memory device based on requests of a host device, and output control signals instructing to generate power consumption profiles for dies which operate in response to the operation commands; and
   a power management unit configured to operate according to the control signals outputted from the processor, the power management unit comprising:
   a power profile command table in which one or more power profile commands corresponding to each of the operation commands are stored;
   a power profile command processing circuit configured to generate the power consumption profiles representing power consumption amounts changing with the lapse of time for each of the dies which operate, by processing the one or more power profile commands corresponding to each control signal; and
   a power budget scheduler configured to determine whether to transmit an operation command other than the operation commands to the nonvolatile memory device, depending on a total power consumption amount summed at each set unit time based on the power consumption profiles,
   wherein each power profile command is a bitmap which includes a mode setting region, a power profile generation time setting region and a power value setting region, and
   wherein the mode setting region comprises:
   a first mode setting bit to set an end reference to generation of the power profile command; and
   a second mode setting bit to set a scheme in which a power value set in the power value setting region is applied for a time period set in the power profile generation time setting region.

2. The data storage device according to claim 1, wherein the power profile command processing circuit comprises a plurality of power profile command processors corresponding to the plurality of dies, respectively.

3. The data storage device according to claim 2, wherein the plurality of power profile command processors fetch one or more power profile commands from the power profile command table according to the corresponding control signals, generate the power consumption profiles for the respective dies which operate, by processing the fetched one or more power profile commands, and output power consumption amounts of the respective dies which operate, to the power budget scheduler, at each set unit time, based on the generated power consumption profiles.

4. The data storage device according to claim 1, wherein the power budget scheduler calculates a marginal power by comparing the total power consumption amount with a set power budget at each set unit time.

5. The data storage device according to claim 4,
   wherein, when a new request is received from the host device, the processor outputs a new control signal instructing to generate a power consumption profile for a new operation command corresponding to the received new request,
   wherein the power profile command processing circuit generates the power consumption profile for the new operation command by fetching one or more power profile commands corresponding to the new control signal from the power profile command table, and outputs an initial power consumption amount, based on the generated power consumption profile for the new operation command, to the power budget scheduler, and
   wherein the power budget scheduler determines whether the marginal power is sufficient to perform the new operation command by comparing the initial power consumption amount for the new operation command with the marginal power, and determines, based on the result of the comparing, whether to transmit the new operation command to the nonvolatile memory device.

6. The data storage device according to claim 5, wherein the power budget scheduler outputs a transfer standby signal for the new operation command when it is determined that the marginal power is not sufficient, and outputs a transfer grant signal for the new operation command when it is determined that the marginal power is sufficient.

7. The data storage device according to claim 6, wherein the controller further comprises:
   a memory interface configured to provide the new operation command to the nonvolatile memory device when the transfer grant signal for the new operation command is received from the power budget scheduler.

8. The data storage device according to claim 1, wherein the control signals include indexes of power profile commands stored in the power profile command table.

9. The data storage device according to claim 1, wherein, when the first mode setting bit is set to a first value, generation of the power profile command ends when an operation of a corresponding operation command is completed, and when the first mode setting bit is set to a second value, generation of the power profile command ends when a time period set in the power profile generation time setting region elapses.

10. The data storage device according to claim 1, wherein, when the second mode setting bit is set to a first value, a power value set in the power value setting region is applied as a constant for a time period set in the power profile generation time setting region, and, when the second mode setting bit is set to a second value, a power value set in the power value setting region is applied as a difference value for a time period set in the power profile generation time setting region.

11. A method for operating a data storage device including a nonvolatile memory device including a plurality of dies and a controller controlling the nonvolatile memory device and including a power profile command table in which one or more power profile commands for each of operation commands to be transmitted to the nonvolatile memory device are stored, the method comprising:
   transmitting operation commands to the nonvolatile memory device based on requests received from a host device, and outputting control signals instructing to generate power consumption profiles for dies which operate in response to the operation commands;

generating the power consumption profiles representing power consumption amounts changing with the lapse of time for each of the dies which operate, by processing one or more power profile commands corresponding to each of the control signals; and determining whether to transmit an operation command other than the operation commands to the nonvolatile memory device, depending on a total power consumption amount summed at each set unit time based on the power consumption profiles, wherein each power profile command is a bitmap which includes a mode setting region, a power profile generation time setting region and a power value setting region, and wherein the mode setting region comprises:

a first mode setting bit to set an end reference to generation of the power profile command; and a second mode setting bit to set a scheme in which a power value set in the power value setting region is applied for a time period set in the power profile generation time setting region.

12. The method according to claim 11, wherein the determining of whether to transmit the operation commands to the nonvolatile memory device comprises:

calculating a marginal power by comparing the total power consumption amount with a set power budget at each set unit time.

13. The method according to claim 12, further comprising:

receiving a new request from the host device;

outputting a new control signal instructing to generate a power consumption profile for a new operation command corresponding to the new request;

generating the power consumption profile for the new operation command, by processing one or more power profile commands corresponding to the new control signal;

outputting an initial power consumption amount of the new operation command, based on the power consumption profile for the new operation command;

determining whether the marginal power is sufficient to perform the new operation command, by comparing the initial power consumption amount of the new operation command with the marginal power; and providing the new operation command to the nonvolatile memory device when it is determined that the marginal power is sufficient.

14. The method according to claim 13, wherein, when it is determined that the marginal power is not sufficient, the new operation command is not provided to the nonvolatile memory device until the marginal power is sufficient to perform the new operation command.

* * * * *